Patented Nov. 7, 1933

1,933,567

UNITED STATES PATENT OFFICE 1,933,567

PROCESS FOR PURIFYING WATER

Hugh Rodman, Oakmont, Pa., assignor to Rodman Chemical Company, Verona, Pa., a corporation of Pennsylvania No Drawing. Application January 6, 1931
Serial No. 506,978

6 Claims. (Cl. 210—9)

This invention relates to water treatment, and especially to the purification of water for domestic purposes, e. g. for drinking and cooking.

A major object is to provide a water treating process which removes objectionable smells and tastes from water and renders it highly palatable, provides water of good keeping quality, is efficient, simple, and low in cost.

Further objects are to provide processes of the type referred to which remove dissolved substances from the water, and which may be combined with known water treating processes without any substantial departure therefrom, and without adding unduly to the treating costs, whereby not only to eliminate undesirable odors and tastes caused or not removed by those processes, but also to remove color due to agents used in their practice.

Many waters have objectionable odors and tastes which render them undesirable for domestic use. Thus, natural waters may be contaminated with dissolved matter which makes their smell or taste offensive. And treated waters, such as those supplied by public service corporations, may be unpalatable, not only by reason of the smell or taste due to the treating agents, but also because of materials in the water which are not removed by the treatments now in use.

In some instances, as in the case of treated waters supplied by municipalities, such tastes and odors may be removed and the water made palatable by treatment with activated carbon, which apparently adsorbs the offensive agents. But while that treatment provides pleasant tasting water, I have found that the use of the commercially available activated charcoals causes the water to develop a greenish moss-like deposit upon storage. According to my experiments this deposit forms when activated charcoal is used even though the water has been concurrently treated with germicidal agents. Therefore such water is of poor keeping quality. Also, such charcoal is so expensive as to render its use for this purpose economically impractical.

I have found, and it is upon this that my invention is predicated, that by treating waters containing unpalatable constituents with coal or coke there result highly palatable waters having exceptional keeping qualities. A particular advantage of these materials is that, so far as I have been able to determine, water treated with them does not develop in storage the objectionable deposit which results from treatment with activated carbons.

The invention will now be described more in detail, and with reference to the use of its preferred embodiment, namely coal. However, it will be understood that the benefits of the invention may be had also through the use of coke.

In accordance with the invention the water to be purified is intimately contacted with the coal or coke in an amount and for a time to effect the desired result preferably by suspending and agitating it with the water. In the preferred practice finely divided coal is used, because the coarser materials are, in general, not as effective insofar as larger quantities or longer exposure to their action is necessary. For example, an impure water having an objectionable taste will be rendered clear and sweet by agitating it for 30 seconds with 10 grams per gallon of 200-mesh coal. On the other hand 150 grams per gallon of coal passing 40 and retained by 60-mesh has almost no effect when agitated with the water for 20 minutes, and after 50 minutes the flavor of the water is still not as good as that produced using 200-mesh material. For most purposes it is preferred to use a coal ground so that the major portion passes 200-mesh. A further advantage of the finer materials is that smaller quantities are needed for purifying equal weights of water than when the coarser grades are used. Particularly satisfactory results are had by the use of coal dust the major portion of which passes a 200-mesh sieve.

Relatively small amounts of coal are required to render palatable water which are highly offensive to the palate. There appears to be no limiting proportionality between the weights of water and coal used, and in fact no limits can be stated since these will vary in large part with the character of the water, and with the degree of subdivision of the coal. However, it may be said that by prolonging the time of treatment very small amounts of coal may be used.

Coal dust is not wet readily by water, but suspensions in water may be formed quickly and easily if the powdered coal is preliminarily mixed with a small amount of water to form a paste, which is then added to the water to be treated. An excellent means of doing this is by wet grinding the coal with water in a ball mill. Enough water to form a mass of porridge-like consistency will suffice, although thinner slurries may be used if desired for any reason.

Simple treatment with coal or coke is beneficial in removing unpleasant odors and tastes from water, the resulting water being of markedly improved palatability. Such water may or may not be sterile, depending upon its previous history. However, the process is compatible with others applied to water for particular purposes. Thus it may be combined with any of the well known chlorine or permanganate or other germicide treatments, whose purpose is to sterilize water. The combined use of a germicide and coal or coke is preferred because the germicides appear further to improve the quality of the water. The process may be used also in conjunction with coagulant or softening treatments.

As a matter of fact the invention is particularly applicable to such combination with other treatments. The odor and taste of chlorine, which is widely used now in purifying water, are obnoxious to many people. However, by applying my coal treatment to chlorinated water there results a water which is of pleasant taste, and odorless. Also, the coal is efficacious in removing color due to water treating agents. For example, in permanganate treatments the water assumes a pinkish or a muddy color, depending upon the amount used. Such water may be made crystal clear by treating it with coal in accordance with this invention.

As showing the benefits to be derived through the practice of the invention, there may be cited the purification of the water now being supplied by pipe to the Boroughs of Verona and Oakmont, Pennsylvania. This water is drawn from the Allegheny River, and because of the low rate of flow of the water, and the amount of industrial waste which is dumped into the river, the water is particularly foul in the raw state. It carries large amounts of sewage and mill and mine wastes, such as iron sulfate, phenol presumably derived from a by-product coke plant, and other impurities. This water is treated by the public service corporation with lime and alum, in the usual manner, and is passed through rapid sand filters and treated with chlorine to kill bacteria and other micro-organisms. As drawn from the tap the treated water has a bad taste and odor, and at times these are so strong as to render the water quite offensive to the palate. Half a glassful left to evaporate leaves the dried glass with a very objectionable odor.

I have treated this water with small amounts of chlorine or potassium permanganate to render it sterile, followed by agitation with a small amount of powdered coal or coke. Upon filtering there is obtained a crystal clear water which is sweet and odorless, and of good keeping quality. Specifically, I have added enough permanganate solution to produce a decidedly pink color, after which the water was shaken with bituminous coal ground to pass 200 mesh, in the proportion of 10 grams of such coal dust per gallon of water. Upon shaking the pink color due to the permanganate disappears immediately.

If less coal be used, for example 5 grams per gallon (10 pounds per thousand gallons) the same result can be obtained by agitating for 10 or 15 minutes. As little as 2 grams per gallon is effective upon longer agitation, and even less can possibly be used by grinding the coal finer or agitating longer.

In addition to its utility in removing objectionable odors and tastes from water, it is also useful for other purposes. Thus, the finely divided coal or coke forms a sludge which may exert a clarifying action similar to that sought in the use of the usual coagulants applied to water. Such a sludge will act whether the water is settled or passed through filter presses. Hence, the coal or coke may be used to replace in whole or in part the coagulants now used.

Furthermore, my process may be applied to the purification of industrial waste waters. For example, it may be used to remove iron salts from mine waters or pickling solutions, or to remove phenol and the like from by-product coke plant wastes. Such treatments are desirable because contamination of the streams into which such waste waters are dumped can thus be minimized. Also, it would be practicable at power stations to remove sulfates from water by my process, the coal or coke being recovered for fuel use.

As illustrative of this phase of the invention, I have applied the same permanganate and coal treatment to water from a drilled well which carries large amounts of iron sulfate, evidently because the well taps a small coal seam. This water deposits iron oxide, with formation of dissolved ferric sulfate, upon exposure to air. Either as pumped or after storage the water can scarcely be drunk because of its acid, astringent taste. After simple treatment with coal dust, and especially after treatment with permanganate and then with coal dust, followed by filtration, in the manner explained above, the water becomes sweet and palatable.

As illustrative of the improved keeping quality of water treated by my invention, impure water may be treated with chlorine or permanganate solution, followed by agitation with powdered coal or coke, and filtration, and the product is sterile, sweet and odorless. I have stored such treated water in open and closed glass vessels by the side of the same impure water treated with germicides and then with activated charcoal. The water treated with coal remains clear and sweet after several months storage, whereas that treated with activated charcoal invariably develops a moss-like deposit after several weeks or months storage.

My tests have shown that all types of coal, whether bituminous, sub- or semi-bituminous, lignite or anthracite, may be used satisfactorily. Also, either slack or lump coal may be used, it being appropriately subdivided before being added to the water.

Although I do not understand the exact action involved in the practice of my invention, it appears that the objectionable impurities in some instances are adsorbed by the coal or coke. Adsorption is a surface phenomenon which requires surfaces having particular characteristics, and activated charcoal has been thought to be the most satisfactory material for adsorbing agents of the character contemplated herein. The production of good adsorption surfaces generally requires special and careful treatments, and ordinary charcoals are very inefficient as adsorbents. On the other hand, the coal and coke used in my process need no preliminary treatment, but are ready at once, and they effectively remove the bad odors and tastes common to water, together with the odor due to chlorine, phenol and other materials which may find their way into water intended for domestic purposes. For these reasons their efficacy for the special purposes of the invention is surprising.

The practice of the invention involves little if any additional cost when applied to waters which are treated by the usual processes, while it effects a marked improvement in the quality of the water. The amount and cost of coal used is small, and even these small amounts can be saved if desired, for example by recovery of the coal for use as a fuel. This may be done by means of filter presses, Dorr thickeners, or the like. Also, the coal with its adsorbed salts might be useful for other purposes, as for fertilizers, or for recovery of the adsorbed substances. These factors make the use of my invention desirable, because it admirably fulfills the requirements of water treating process that the materials used shall be initially cheap, highly efficient, and easily used. As noted, it has the further advantage that the materials used are recoverable for other uses.

I claim:

1. In a process of treating water to render it potable the steps comprising agitating the water with a material of the group comprising coal and carbonaceous coke finely divided for ready suspension in the water, in an amount and for a time to remove objectionable constituents from the water, and thereafter separating the water from suspended solids.

2. A process of treating water to render it potable, comprising adding to a major quantity of the water a small amount of a material of the group comprising coal and carbonaceous coke ground to pass about 100 mesh, agitating the water with said material to effect intimate suspension therein for a time to render it odorless, palatable and good keeping quality, and thereafter separating the water from suspended solids.

3. A process of treating water to render it potable, comprising agitating in a major quantity of the water a small quantity of bituminous coal finely powdered at least to about 200 mesh, continuing the agitation for a time to render the water odorless, palatable and of good keeping quality, and thereafter separating the water from said coal.

4. In a process of treating water with a germicidal, clarifying or softening agent, the step of agitating the water with a suspended finely powdered material of the group comprising coal and carbonaceous coke in an amount and for a time to render the water odorless, palatable and of good keeping quality, and thereafter separating the water from suspended solids.

5. A process of treating water to render it potable, comprising chlorinating the water to sterilize it, then agitating the water with a small suspended amount of finely powdered material of the group comprising coal and carbonaceous coke for a time to render the water odorless, palatable and of good keeping quality, and thereafter separating the water from suspended solids.

6. A process of treating water to render it potable, comprising treating the water with a permanganate, then agitating the water with finely powdered suspended material of the group comprising coal and carbonaceous coke, in an amount and for a time to render the water odorless, palatable and of good keeping quality, and thereafter separating the water from suspended solids.

HUGH RODMAN.